INVENTOR
ALBERT W. BAIRD
BY
*E. Greenewald*
ATTORNEY

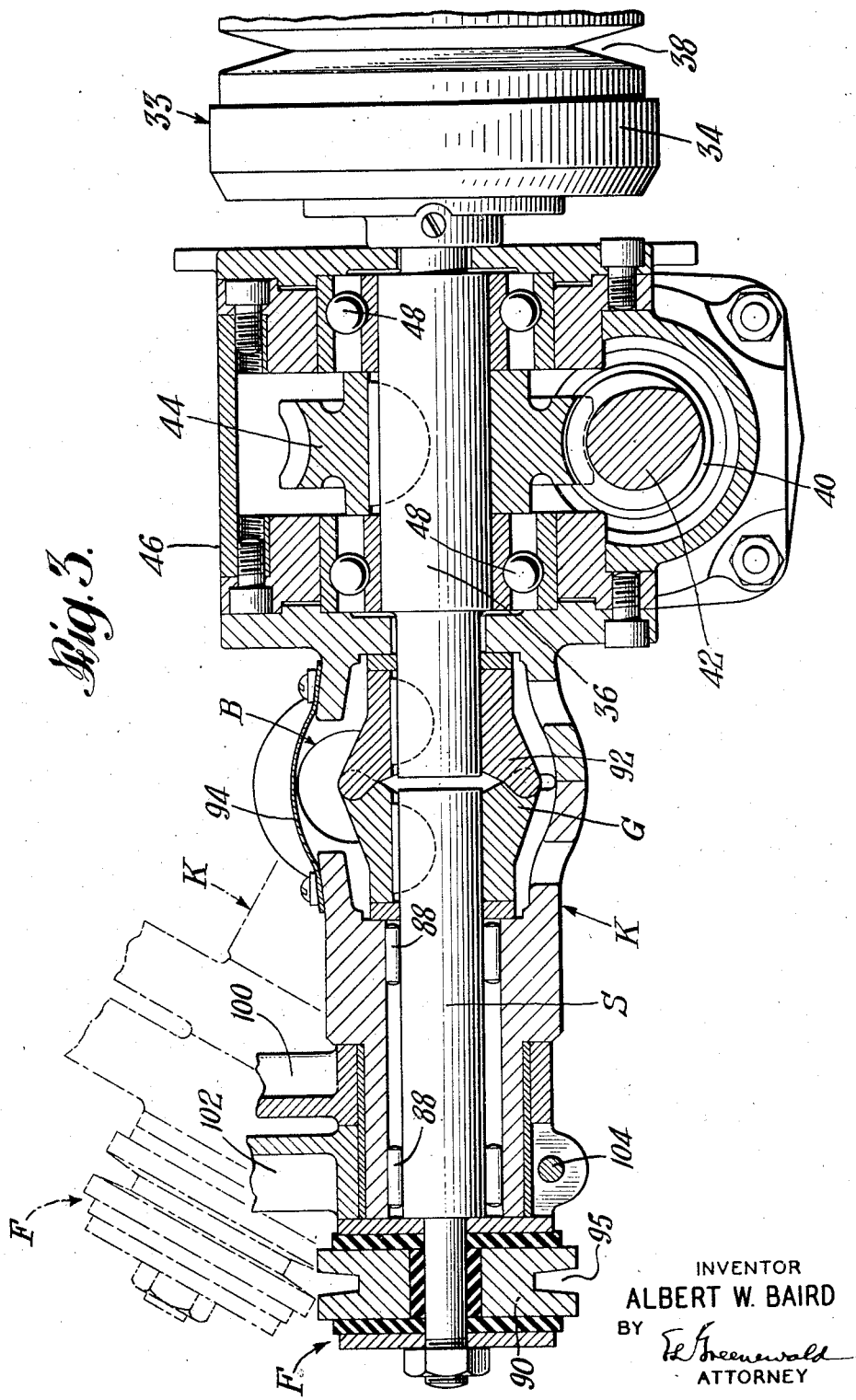

Patented Dec. 16, 1947

2,432,495

UNITED STATES PATENT OFFICE 2,432,495

WELDING APPARATUS

Albert W. Baird, Cranford, N. J., assignor to The Linde Air Products Company, a corporation of Ohio Application August 15, 1944, Serial No. 549,540

11 Claims. (Cl. 219—8)

This invention relates to electric welding apparatus and more particularly to an improved automatic welding machine which is suitable for either butt or fillet welding.

Welding apparatus embodying the invention is particularly suitable for welding according to the process disclosed in Patent No. 2,043,960, dated June 9, 1936, wherein an electric welding current is passed from a fusible metal electrode, such as bare steel rod or wire, through a granular inorganic welding medium to the metal work being welded. Such welding medium has a high electrical resistance when cold and is substantially free from substances that produce deleterious amounts of gas under welding conditions. As the welding operation proceeds along the work, the welding medium is supplied to the welding zone and the welding rod is continuously fed toward said zone to constantly maintain the fusing end of the welding rod under a blanket of the welding medium.

The main objects of this invention are to provide: automatic welding apparatus that is efficient, compact, light in weight, readily adjustable, and does not require a track; a welding machine including a mobile carriage on which are mounted a welding rod supply reel and a rod feeding and guiding device, such reel and device being tiltable as a unit about an axis which is parallel to the direction of travel of the carriage, so that the machine may be readily adjusted for either butt welding or fillet welding without changing the load of such device; a pilot assembly including a bus bar and welding rod nozzle mounted for suitable adjustment corresponding to that of the rod feeding device or independently thereof; improved means for driving the rod feeding device and carriage; apparatus including rod or wire carrying, feeding and guiding means that is simple and economical in its parts and effective and efficient in operation; an improved rod feeder and guide which does not mar the surface of the rod; a novel carriage speed adjustment; a welding machine that is compact, especially from one side to the other; a pilot assembly including a guide wheel and a rod nozzle, which is supported so as to float with respect to the carriage, the pilot assembly following the contour of the work being welded, and the rod feeding movement through the nozzle urging the guide wheel against the work; and apparatus which is suitable for either mobile machine welding or mobile work welding. These and other objects will be appreciated by those skilled in the art from the following description and the accompanying drawings.

In the drawings:

Fig. 3 is an enlarged view in cross-section taken on line 3—3 of Fig. 2.

Figure 1:
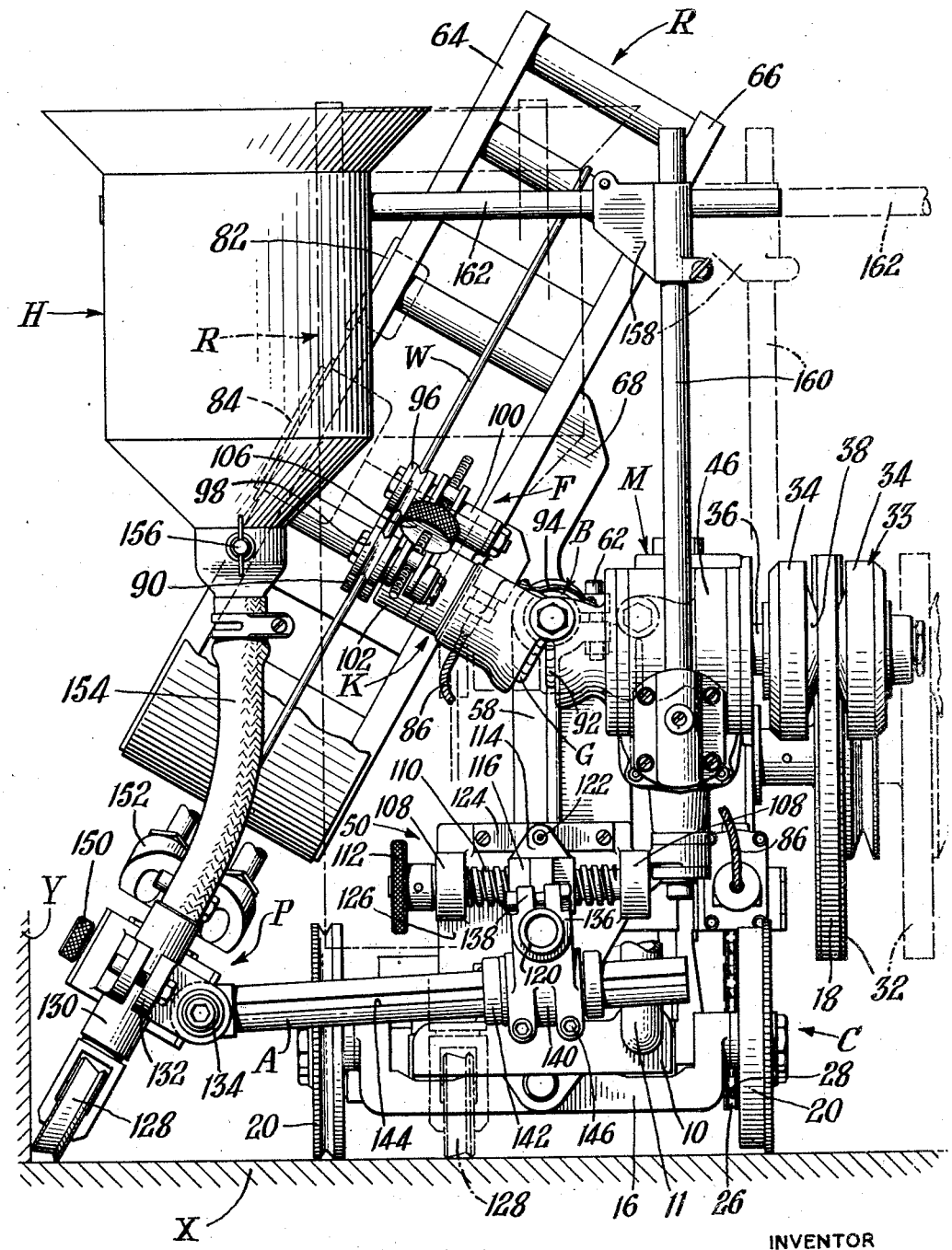
Fig. 1 is a view in front elevation of a mobile welding machine exemplifying the invention.

The improved welding apparatus shown in the drawings includes a mobile carriage C on which are mounted a welding rod supply reel R, a welding rod guiding and feeding device or feeder F, a pilot assembly P including a welding rod nozzle N for receiving the welding rod W from the feeding device F and conducting electric welding current thereto, a container or hopper H for supplying welding medium to the welding zone, and a fluid or electric motor M for driving the carriage C and welding rod feeding and guiding device F. The welding rod supply reel R and the rod feeding device F are mounted on the carriage C as to be tiltable as a unit laterally about an axis which extends in the direction of travel of the carriage, so that the machine may be used for either butt welding or fillet welding operations. Alternatively, separate air or electric motors may be used for driving the carriage and welding rod feeding device, if desired.

One of the principal novel features of the present apparatus resides in the novel mounting of the rod supply reel and rod feeding device on the carriage. This is accomplished, as shown in the drawings, by a horizontal supporting bar B mounted on the carriage C in parallel relation with the path of travel of the carriage, the welding rod supply reel R being supported by such bar. The forward end of the bar B is connected to the housing K of a drive shaft S which drives the rod feeding means F from the motor M, the shaft S being provided with a crown gear G so that the shaft S may be tilted yet continue to drive the rod feeding means F. By this arrangement, tilting of the reel R causes tilting of the feeding means F, without changing the relative positions of the reel and feeding means with respect to one another. Thus, the rod feeding load on the motor M is not increased due to twisting of the welding rod between the reel and the feeder.

The carriage C preferably comprises an inverted box frame 10. Lifting handles 11 are connected to opposite ends of the frame. Near one end of the frame 10 is a transverse shaft 12 mounted in suitable bearings. A pair of carriage supporting wheels 14, 14 are fixed to opposite ends of the shaft 12. Near the other end of the frame 10 is a "fifth wheel" 16 which has stub shafts 22 on which are mounted carriage supporting wheels 20. The "fifth wheel" 16 is connected at the center to the frame 10 in such a way that the fifth wheel is free to tilt in a vertical plane with supporting surface irregularities. The fifth wheel 16 is also adjustable to turn in a horizontal plane to direct the carriage laterally, so that if such direction is opposed by the vertical work Y, the wheels 20 slip on the supporting surface of the horizontal work X, for example, and thus laterally biases the carriage C as it travels against the vertical work Y.

The wheels 14 and 20 have peripheral surfaces or treads that are adapted to run directly on the surface of the work X without any track or rails. Such peripheral surfaces are shaped, however, so that the carriage may be supported and guided by the work or by a channel in the conventional way. The present invention, however, obviates the need for such channel.

The wheel shaft 12 is connected so as to be driven by the motor M through a belt 18 and speed reducing gears within a transmission housing 24. A gear shift lever 25 having "neutral," "forward" and "reverse" shifts is also provided.

The housing 24 is mounted to tilt about the axis of shaft 12, without affecting the driving relation of a chain 26 which connects the transmission in the housing 24 to a sprocket 28 on the shaft 12. The housing 24 is tilted and secured in adjusted position by a screw 30 acting between the frame and the housing. Since the belt 18 connects a pulley 32 on the housing 24, and a split pulley 33 which is driven by the motor M, the speed of the carriage may be accurately adjusted by turning the screw 30. The split pulley 33 includes a pair of cones 34, 34 which are keyed to a shaft 36 and disposed so as to provide an annular groove 38 for the belt 18. The cones 34 are normally urged by internal spring means toward each other, to provide a maximum effective radius in the groove 38 for the belt 18. However, when the housing 24 is tilted so as to increase the distance between the pulleys 32 and 33, the cones 34 are moved axially away from each other by the tension of the belt 18, decreasing the effective radius of the pulley 33, and thus changing the speed of the carriage with respect to that of the motor M.

As shown in Fig. 3, the pulley 33 is connected to the outer end of the shaft 36 which is driven by the armature 40 of the motor M through a worm gear 42 and a pinion gear 44, the latter being keyed to the shaft 36 and the former being connected to the motor armature 40. The shaft 36 is supported in a housing 46 by ball bearings 48, 48, the housing 46 and the motor M being mounted on a supporting bracket 50 which is adjustable and removably mounted on the frame 10 of the carriage C.

The supporting bracket 50 and the parts attached thereto may be removed as a unit from the carriage C for attachment to a stationary member with respect to which the work to be welded is moved by suitable means known to those skilled in the art. The bracket 50 is connected to the carriage frame 10 by bolts 52 which extend through transverse slots 54 in the top 56 of the frame, so that the bracket 50 may be adjusted transversely with respect to the frame, and secured in adjusted position.

The supporting frame 50 is provided with an upright member 58 having at its upper end a clamp 60 which engages and supports the horizontal bar B so that the bar extends in the general direction of travel of the carriage. The bar B is so mounted in the clamp 60 that the bar may be adjusted about its longitudinal axis and secured in adjusted position by tightening bolts 62, 62 of the clamp 60.

As pointed out above, the welding rod supply reel and the rod feeding and guiding device K are connected to the bar B, so that the reel and device K are adjustable as a unit about the axis of the bar. The reel is also longitudinally and circumferentially adjustable on the bar B.

The reel R preferably is of the stationary type, including side disks 64 and 66, the disk 66 being provided with a central bracket 68, the lower portion of which is in the form of a clamp 70. By loosening the clamp 70, the reel may be adjusted to any desired position on the bar, circumferentially or axially. The clamp 70 engages the bar B so that the bar and the reel may be turned together about the longitudinal axis of the bar which is parallel to and substantially centrally disposed about the carriage frame 10.

The reel is preferably composed of light material, such as aluminum, and includes a removable annular cover 72, having radial keys 74 which engage retaining members 76 in such manner that any frictional engagement of the welding rod W with the inside of the cover 72, as the rod is withdrawn from the reel, tends to turn the cover to maintain the keys 74 in engagement with the retainers 76. However, the cover 72 may be removed to load the reel with a coil of rod, by turning the cover in the opposite direction to disengage the keys 74 from the retainers 76, handles 78 being provided on the cover 72 for this purpose.

Indicating instruments such as a voltmeter 80, an ammeter 82 and a speedometer 84 may be mounted on the outer side of the reel R, the voltmeter and ammeter being electrically connected to the welding circuit, and the speedometer being mechanically connected to the carriage wheels 14 through gears in the transmission housing 24 by suitable means, including a flexible shaft 86.

As pointed out above, the forward end of the bar B is connected to the housing K containing the drive shaft S, the housing K also supporting the rod feeding device F at its outer end. Thus, when the bar B is adjusted about its longitudinal axis, the welding rod reel R and the rod feeding device F tilt as a unit so that any twisting of the rod W between the reel R and the feeding device F is inhibited. Thus, the rod feeding load on the motor M is kept constant.

The housing K is provided with suitable roller bearings 88, 88 for the shaft S, the crown gear G being keyed to the inner end of the shaft, and a rod driving roll 90 of the feeder F being bolted to the outer end of the shaft. The crown gear G on the shaft S meshes with a corresponding gear 92 on the shaft 36. The longitudinal axis of the bar B is arranged in line with the meshing teeth at the top of the crown gears so that the housing K and rod feeder F may be tilted upwardly, as indicated in broken lines in Figure 3, without opening the driving connection between the crown gears. In order to keep out dust and particles of the welding material, the space between the housing K and the housing 46 over the crown gears G is provided with a flexible dust cover 94, and the entire connection may be enclosed in a suitable flexible housing (not shown).

The rod driving roll 90 is provided with an annular peripheral groove 95 which faces smaller annular grooves in a pair of guide rolls 96 and 98 which are mounted to cooperate with the rod driving roll, so as to bend and to direct the welding rod W properly toward the nozzle N. The guide roll 96 is mounted on a bracket 100 which is mounted on the housing K so as to be adjustable about the longitudinal axis of the shaft S. The guide roll 98 is likewise mounted on a bracket 102 which is adjustably mounted on the housing K, the bracket 102 being provided with means including a bolt 104 for clamping the bracket 102 in adjusted position on the housing K. The circumferential position of the guide roll 98 determines the direction of movement of the welding rod W as it leaves the feeder F.

The brackets 100 and 102 on which the guide rolls are mounted, are connected by a turnbuckle 106 for adjusting the distance between the guide rolls circumferentially with respect to the driver roll 90, to impart a desired degree of curvature to the welding rod W, between the reel R and nozzle N. The rod contacting surfaces of the rolls 90, 96 and 98 are smooth so that the surface of the welding rod W is not marred in any way, since this decreases the life of the nozzle N due to the sliding frictional engagement between the interior of the nozzle and the rod, which is necessary to insure good electrical contact between such parts for the welding current.

The supporting bracket 50 is provided with a pair of spaced bearings 108, 108 in which is mounted a screw 110 having a handle 112 connected to one end. The screw 110 is disposed substantially horizontal and transversely of the direction of movement of the carriage C. A bracket 114 has an internally threaded portion 116 engaging the screw 110 so that the bracket 114 may be axially shifted by turning the screw 110 in the bearings 108. The bracket 114 is also provided with a socket 118 in which is mounted the rear end of a stem 120 of the pilot assembly P. The end of the stem 120 is held in the socket 118 by a pin 121. With this arrangement the pilot assembly P is free to float vertically by virtue of the mounting of the screw 110 in the bearings 108, such floating movement of the pilot assembly may be restricted as desired or stopped entirely by tightening screws 122 carried by the bracket 114, with respect to abutments 124, 124 on the front face 126 of the supporting bracket 50.

The pilot assembly P includes a guide wheel 128 in addition to the stem 120 and rod nozzle N. The periphery of the guide wheel 128 is suitably shaped for engagement with the corner of a plate being lap welded to another plate, or for butt welding two plates, or for engagement with the plates X and Y being fillet welded as shown in Fig. 1. The guide wheel 128 is mounted on a bifurcated member 130 which is engaged by a clamp 132, the latter being pivotally connected at 134 to the outer end of a transverse arm A which is, in turn, connected to the forward end of the stem 120. The arm A is connected to the stem 120 by a bracket 136, having a clamp 138 engaging the stem 120, and a clamp 140 engaging a sleeve 142 within which the arm A is free to move longitudinally but not rotate, rotary movement of the arm in the sleeve 142 being prevented by groove 144 in the arm which engages a corresponding tongue in the sleeve 142.

However, the arm A and sleeve 142 may be rotated within the clamp 140, and secured in any desired position by tightening the cross-bolts 146 of the latter. If desired, a suitable spring may be provided between the arm A and the sleeve 142 to urge the arm A and the pilot assembly connected thereto, laterally with respect to the carriage. Furthermore, the parts may be loosened so that the arm A is free to move longitudinally with respect to the carriage or supporting structure, so that the pilot assembly follows a guide independently of the carriage or supporting structure.

The rod nozzle N is carried by a bracket 148 which is mounted on the clamp 132 for transverse adjustment by suitable means, including a screw 150. An electrical conductor or bus bar 152 is connected to the upper end portion of the nozzle end, and the bracket 148 is provided with a vertical hole through which the lower end portion of a flexible hose 154 extends. The upper end of the hose 154 is connected to the outlet of the welding medium hopper H, there being a valve 156 provided in the outlet of the hopper for controlling the amount of welding medium supplied to the hose. The hopper H is supported by bracket 158 including an upright member 160, and a horizontal member 162 so that the hopper may be secured in any desired position with respect to the pilot assembly P.

The machine is very compact, occupying very little room from one side to the other, and the parts may be adjusted so that the welding takes place along a line extending between the wheels under the carriage or along a line which is outside of either side of such wheels. The former is accomplished by moving the supporting bracket 50 and the parts associated therewith to the extreme right of the carriage frame as shown in broken lines in Fig. 1. Furthermore, the bracket 50 and the parts associated therewith may be removed entirely from the carriage, and mounted on a stationary support, for welding work which is moved with respect to the bracket.

Figure 2:
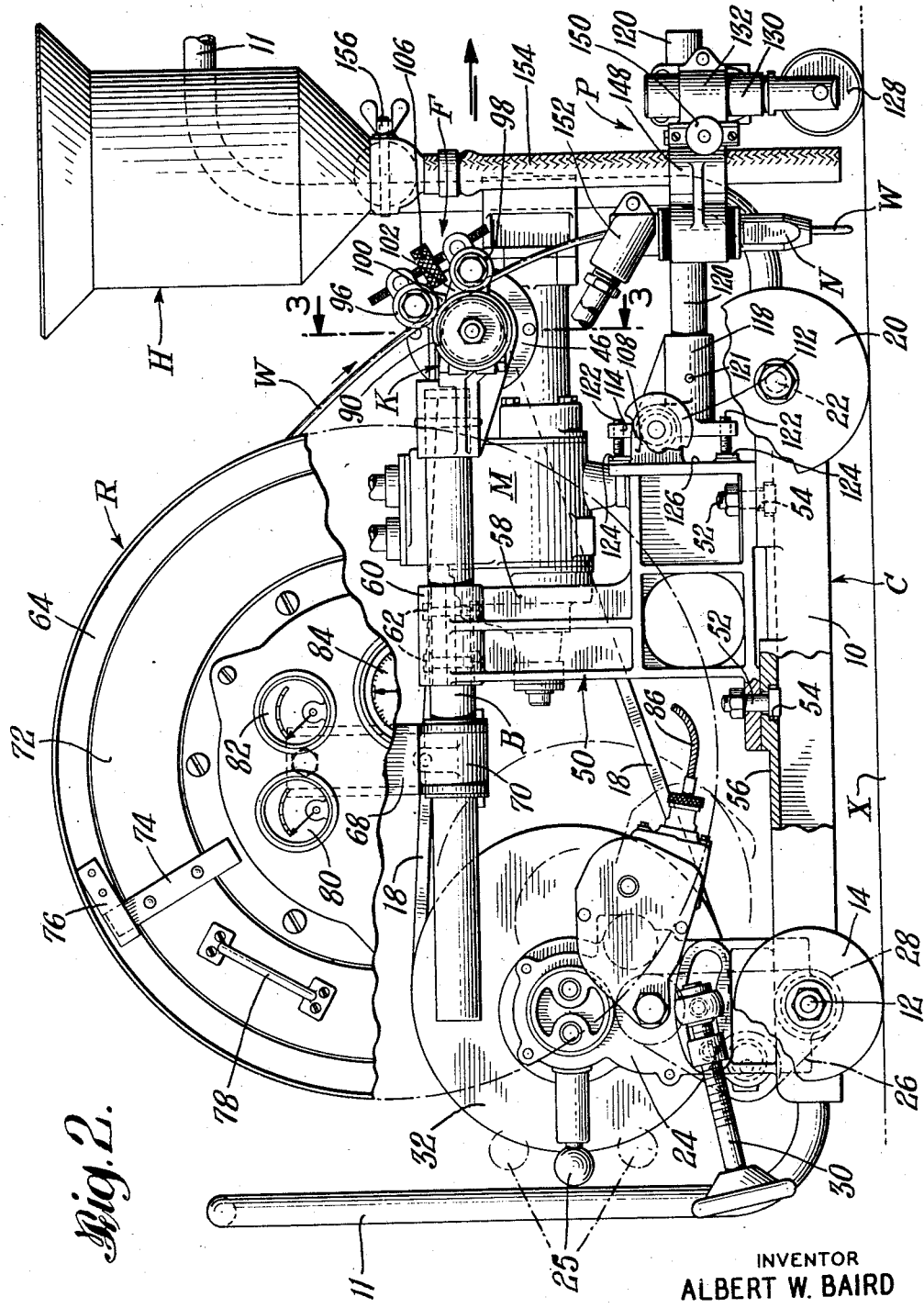
Fig. 2 is a view in side elevation of such machine, parts being broken away to show the interior.

In operation, assuming that the various necessary adjustments have been made and the parts locked in adjusted position, the motor M drives the carriage C through the supporting wheels 14, and at the same time the motor M drives the rod feeder F so that the rod W is fed through nozzle N to the welding zone as the latter receives welding medium from the tube 154. Since the rod nozzle N is connected to a suitable source of welding current, welding takes place according to the process covered by Patent No. 2,043,960. For butt welding, the parts are adjusted as shown in Fig. 2 of the drawings, while for a fillet welding the parts are adjusted as shown in Fig. 1. Welding machines embodying the invention have proved to be entirely satisfactory for both fillet and butt welding. The machine is particularly well adapted to use a compressed-air motor which drives both the carriage and the rod feed device, as well as separate compressed-air or electric motors or both for driving the carriage and the rod feed device.

I claim:

1. Welding apparatus comprising, in combination, a mobile carriage on which are mounted: a welding rod supply reel, a rod feeding and guiding device, means for receiving rod from said device and for conducting welding current to such rod, a container provided with means for delivering a welding medium to a welding zone, a motor connected to drive the carriage and rod feeding device, and common means supporting said welding rod supply reel and feeding and guiding device and being so mounted on the carriage as to be tiltable as a unit with respect to said carriage about an axis which extends in the direction of travel of said carriage, for either butt welding or fillet welding operations, without changing the rod feeding load on said motor.

2. In a welding machine, a welding carriage provided with a frame and supporting wheels, a carriage driving motor mounted on said frame, a bracket including a bar disposed longitudinally with respect to said welding carriage, a welding rod supply reel mounted on said bar, a welding rod feeder connected to said bar for cooperation with said reel in feeding welding rod from said supply reel to a welding zone, means including a joint connecting said motor in driving relation to said welding rod feeder, and means including a clamp connecting said bar to said frame so that said bar is adjustable about the longitudinal axis of said bar, said joint being positioned so that said rod feeder is adjustable with said reel without affecting the driving connection between said motor and said rod feeder.

3. In combination, a carriage comprising a wheeled frame provided with a longitudinal member having a forwardly projecting end portion, a welding rod supply reel and feeder mounted on said frame for simultaneous tiltable adjustment with respect to said frame about an axis which parallels said member, a motor connected to drive said carriage and said welding rod feeder, a bracket mounted on said end portion for rotary and longitudinal adjustment, a transverse arm carried by said bracket for longitudinal adjustment transversely of said end portion, a pilot assembly mounted on one end of said arm for rotary adjustment about an axis which is parallel to that of said member, and a rod nozzle mounted on said pilot assembly.

4. In combination, a carriage including a horizontal frame having shaft bearings, shafts mounted in said bearings, carriage supporting wheels connected to said shafts, a motor mounted on said frame, means located on one side of the carriage and connecting said motor in driving relation with one shaft, a horizontal bar mounted for rotary adjustment on said frame, and a rod supply reel and feeder located on the other side of the carriage and mounted on said bar for simultaneous adjustment with said bar.

5. In combination, a carriage including a frame and supporting wheels, a motor mounted on said frame, means connecting said motor to at least one of said wheels for driving said carriage; a bar mounted on said carriage for rotary adjustment about an axis which is parallel to the path of travel of the carriage, a rod supply reel mounted on said bar, a rod feed device and means including a joint connecting said motor in driving relation with said device, said joint being located adjacent one end of said bar.

6. In combination, a carriage including a frame and supporting wheels, a carriage driving motor mounted on said frame, a rod supply reel, a rod feeder, means connecting said rod feeder in driven relation to said motor, and means mounting said rod supply reel and feeder on said frame in such manner that the rod supply reel and feeder are tiltable as a unit with respect to said frame while maintaining said connecting means, said mounting means including a bracket mounted on said frame for tilting movement with respect to said carriage about an axis lying in the path of travel of said carriage, and means for locking said bracket in adjusted position on said frame.

7. In combination, a carriage including a frame, a transverse shaft mounted to rotate on said frame, a pair of carriage supporting wheels fixed to said shaft, a transmission housing mounted on said frame to tilt about the axis of said shaft, a pulley mounted on said housing, gears in said housing connecting said pulley to said shaft, a carriage driving motor mounted on said frame, a split pulley connected to said motor, said split pulley comprising a pair of cones arranged to form an annular groove, and spring means urging said cones toward each other, a belt connecting said pulleys, and means including a screw acting between said frame and said housing for adjusting the tilt of said housing to change the distance between said pulleys, thereby changing the effective radius of said split pulley, and the speed at which the carriage is driven by said motor.

8. In combination, a carriage, a bracket mounted on said carriage to tilt about an axis extending in the general direction of travel of said carriage, a rod supply reel and feeder connected to said bracket for tilting therewith, said reel and feeder being disposed so as to move the rod in a plane which is substantially parallel to such axis, a pilot assembly including a guide wheel and a rod nozzle, means connecting said pilot assembly to said carriage for limited floating movement with respect to said carriage, said means including means for adjusting the position of said pilot assembly with respect to said carriage and bracket, a motor on said carriage connected to drive said rod feeder, and said rod feeder acting through the rod fed therefrom and the frictional engagement of such rod with the nozzle to urge the guide wheel of said pilot assembly into contact with the work, so that the pilot assembly follows the contour of the line over which said pilot rolls as the carriage moves in the direction of such line.

9. In combination, a carriage, a rod supply reel and feeder mounted on said carriage, a pilot assembly including a guide wheel and a rod nozzle, means connecting said pilot assembly to said carriage for limited floating movement with respect to said carriage, a motor on said carriage connected to drive said rod feeder, and said rod feeder acting through the rod fed therefrom and the frictional engagement of such rod with the nozzle to urge the guide wheel of said pilot assembly into contact with the work, so that the pilot assembly follows the contour of the line over which said pilot rolls as the carriage moves in the direction of such line.

10. In combination, a carriage having supporting wheels, a bracket mounted on said carriage, a rod supply reel and feeder connected to said bracket, a pilot assembly including a guide wheel and a rod nozzle, means connecting said pilot assembly to said carriage for limited floating movement with respect to said carriage, a motor on said carriage connected to drive said carriage through at least one of said carriage wheels, said motor being also connected to drive said rod feeder, and said rod feeder acting through the rod fed therefrom and the frictional engagement of such rod with the nozzle to urge the guide wheel of said pilot assembly into contact with the work, so that the pilot assembly follows the contour of the line over which said pilot rolls as the carriage moves in the direction of such line.

11. In combination, a support, a pair of spaced bearings on said support, a horizontal screw mounted in said bearings, a bracket having an internally threaded portion engaging said screw so that the bracket may be axially shifted by turning said screw in said bearings, said bracket also having a socket, a stem having one end in said socket, and connected to said bracket, a pilot assembly including a guide wheel, a nozzle and means for adjusting said nozzle laterally with respect to said guide wheel, and means including an arm disposed in a plane at right angles to the axis of said stem, connecting said pilot assembly to said stem, so that the pilot assembly is free to float by virtue of the mounting of said screw in said bearings.

ALBERT W. BAIRD.

REFERENCES CITED

The following references are of record in the file of this patent:

UNITED STATES PATENTS

| Number | Name | Date |
| --- | --- | --- |
| 1,580,020 | Cutler | Apr. 6, 1926 |
| 2,182,575 | Baird et al. | Dec. 5, 1939 |
| 1,875,483 | Naylor | Sept. 6, 1932 |
| 2,032,260 | Chapman | Feb. 25, 1936 |

FOREIGN PATENTS

| Number | Country | Date |
| --- | --- | --- |
| 87,118 | Austria | Jan. 25, 1922 |